(12) United States Patent
Zou

(10) Patent No.: US 11,982,908 B2
(45) Date of Patent: May 14, 2024

(54) DISPLAY DEVICE AND MANUFACTURING METHOD THEREOF

(71) Applicant: SHENZHEN CHINA STAR OPTOELECTRONICS SEMICONDUCTOR DISPLAY TECHNOLOGY CO., LTD., Shenzhen (CN)

(72) Inventor: Guangnan Zou, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 277 days.

(21) Appl. No.: 17/434,188

(22) PCT Filed: May 28, 2021

(86) PCT No.: PCT/CN2021/096779
§ 371 (c)(1),
(2) Date: Aug. 26, 2021

(87) PCT Pub. No.: WO2022/170692
PCT Pub. Date: Aug. 18, 2022

(65) Prior Publication Data
US 2022/0252917 A1    Aug. 11, 2022

(51) Int. Cl.
*G02F 1/1339* (2006.01)
*G02F 1/1333* (2006.01)

(52) U.S. Cl.
CPC ...... *G02F 1/1339* (2013.01); *G02F 1/133308* (2013.01); *G02F 2202/28* (2013.01)

(58) Field of Classification Search
CPC . G02F 1/1339; G02F 1/13308; G02F 2202/28
USPC .......................................................... 361/807
See application file for complete search history.

(56) References Cited

U.S. PATENT DOCUMENTS

2016/0291404 A1* 10/2016 Kim .................. G02F 1/133528
2019/0129219 A1*  5/2019 Fujita ..................... G06F 3/0412
2021/0011327 A1*  1/2021 Nakui ............... G02F 1/133308
(Continued)

FOREIGN PATENT DOCUMENTS

CN    103786340 A    5/2014
CN    204406002 U    6/2015
CN    104749809 A    7/2015
(Continued)

*Primary Examiner* — Binh B Tran
(74) *Attorney, Agent, or Firm* — The Roy Gross Law Firm; Roy Gross

(57) ABSTRACT

A display device and a manufacturing method thereof are disclosed. The display device includes a substrate, a display panel, and a frame sealant layer. The display screen includes a display region and a non-display region. The frame sealant layer is configured to adhere the display panel and the substrate. The frame sealant layer is correspondingly distributed in the non-display region of the display panel and surrounds the display region. The frame sealant layer includes liquid adhesive regions and solid adhesive regions disposed at intervals. Each of the liquid adhesive regions is provided with a liquid adhesive. Each of the solid adhesive regions is provided with a solid adhesive.

10 Claims, 6 Drawing Sheets

(56) References Cited

U.S. PATENT DOCUMENTS

2021/0063807 A1\* 3/2021 Araki .................. G02F 1/13332

FOREIGN PATENT DOCUMENTS

| CN | 104985885 A | 10/2015 |
| CN | 209433744 U | 9/2019 |
| CN | 110379299 A | 10/2019 |
| CN | 210803905 U | 6/2020 |

\* cited by examiner

DISPLAY DEVICE AND MANUFACTURING METHOD THEREOF

This application is a National Phase of PCT Patent Application No. PCT/CN2021/096779 having International filing date of May 28, 2021, which claims the benefit of priority of Chinese Patent Application No. 202110185286.5, filed Feb. 10, 2021, the contents of which are all incorporated herein by reference in their entirety.

FIELD OF INVENTION

The present application is related to the field of display technology and specifically to a display device and a manufacturing method thereof.

BACKGROUND OF INVENTION

With rapid development of display technology, curved display panels (such as curved displays and curved televisions) have gradually come into visions of people.

As shown in FIGS. 1 and 2, FIG. 1 is a structural schematic diagram of a conventional display device attached with a double-sided tape, and FIG. 2 is a structural schematic diagram of a conventional display device attached with a liquid adhesive being dispensed. During a manufacturing process of a curved display, a frame sealant layer 13 is disposed between a display panel 12 and a substrate 11. Generally speaking, there are substantially two kinds of frame adhering methods. A first one of the methods is a double-sided tape frame adhering method, referring to FIG. 1. A second one of the methods is a liquid adhesive frame adhering method, referring to FIG. 2. The substrate 11 is a backlight module or a cover plate.

When the double-sided tape frame adhering method is applied to adhere the display panel to the backlight module (or the cover plate), the curved display achieves a narrow frame (that is, a width of a frame of a narrow frame display panel generally ranges from 1 to 2 mm). Therefore, the frame of the curved display has a problem of adhesive separation due to an adhering area being too small. It can also be stated that, in a process of the display panel forming the curved display, the adhesive separation will occur to the display panel, due to a stress in a middle of the display panel being greater than a stress at the frame that causes an adhesiveness at the frame being insufficient.

When the liquid adhesive frame adhering method is applied to adhere the display panel to the backlight module (or the cover plate), the liquid adhesive is applied to a side of the display panel and the backlight module (or the cover plate), then sequentially proceed with adhering, adhesive curing, cutting, inspecting, printed circuit board (PCB) board binding, polarizer adhering, pre-bending, polarizer curing, and finally in a module assembly section, and let it be bent naturally on the curved backlight to form the curved display. Although an adhesiveness of the liquid adhesive is greater than an adhesiveness of the double-sided tape, the liquid adhesive causes a low production efficiency due to a long curing time and is inconvenient for operating. Meanwhile, the liquid adhesive is easily pressed during a laminating process and its thickness cannot be guaranteed, thereby affecting the adhesiveness and eventually leading to the adhesive separation at the frame of the display panel.

Currently, people are pursuing for a display device with a less curvature and a narrower frame. Therefore, an adhering quality of the frame sealant of the display device becomes a difficult point.

SUMMARY OF INVENTION

The present application provides a display device and a manufacturing method thereof, so as to solve technical problems that a double-sided tape or a liquid adhesive easily causing adhesive separation of a frame sealant of a display device.

In order to achieve the above purposes, the present application provides a display device including:

a substrate; a display panel including a display region and a non-display region surrounding the display region; and a frame sealant layer configured to adhere the display panel and the substrate, wherein the fame sealant layer is correspondingly distributed in the non-display region of the display panel and surrounds the display region, the frame sealant layer includes liquid adhesive regions and solid adhesive regions disposed at intervals, each of the liquid adhesive regions is provided with a liquid adhesive, and each of the solid adhesive regions is provided with a solid adhesive.

Furthermore, the solid adhesive is a double-sided tape. The liquid adhesive is any one of a moisture curing liquid adhesive, a heat curing liquid adhesive, or an AB glue.

Furthermore, distances between two adjacent liquid adhesive regions and one of the solid adhesive regions range from 2 to 3 micrometers (um).

Furthermore, an area of each of the solid adhesive regions is less than an area of each of the liquid adhesive regions.

Furthermore, the substrate is a backlight module or a cover glass.

Furthermore, the backlight module includes a light-emitting region and a frame region surrounding the light-emitting region. The backlight module is attached to the display panel, the light-emitting region faces the display region, the frame region faces the non-display region, and the frame sealant layer is disposed in the frame region of the backlight module and surrounds the light-emitting region.

Furthermore, the display panel includes four corners. Each of the corners is provided with one of the liquid adhesive regions.

In order to achieve the above purposes, the present application further provides a manufacturing method of a display device including steps of:

providing a substrate;
providing a display panel including a display region and a non-display region surrounding the display region; and
forming a frame sealant layer between the display panel and the substrate to adhere the display panel and the substrate, wherein the fame sealant layer is correspondingly distributed in the non-display region of the display panel and surrounds the display region, the frame sealant layer includes liquid adhesive regions and solid adhesive regions disposed at intervals, each of the liquid adhesive regions is provided with a liquid adhesive, and each of the solid adhesive regions is provided with a solid adhesive.

Furthermore, the step of forming the frame sealant layer between the display panel and the substrate includes a step of:

dispensing any one of a moisture curing liquid adhesive, a heat curing liquid adhesive, or an AB glue at a frame region of the substrate to form the liquid adhesives disposed at intervals; wherein the liquid adhesives form the liquid adhesive regions of the frame sealant layer, the display panel includes four corners, each of the corners is provided with one of the liquid adhesive regions, and the liquid adhesives are formed in the liquid adhesive regions; and the frame region of the substrate is attached with a double-sided tape to form the solid adhesives disposed at intervals, and the solid adhesives form the solid adhesive regions of the frame sealant layer.

Furthermore, after the step of forming the frame sealant layer between the display panel and the substrate, the manufacturing method of the display device further includes a step of: laminating the display panel and the substrate.

Compared with the prior art, the present application provides a display panel and a manufacturing method thereof, wherein the liquid adhesive and the solid adhesive are disposed at intervals. While solving a problem of the liquid adhesive being pressed before curing causing an adhesiveness not being able to be ensured and an adhesive space of a narrow frame display device being limited, the solid adhesive provides a certain degree of rigidity for the liquid adhesive, such that the display panel and the substrate provides a support for the liquid adhesive during an adhering process, which enhances an overall adhesiveness of the display device.

DESCRIPTION OF DRAWINGS

Technical solutions and other beneficial effects of the present application will be obvious through detailed descriptions of embodiments of the present application accompanying drawings as below.

Figure 1:
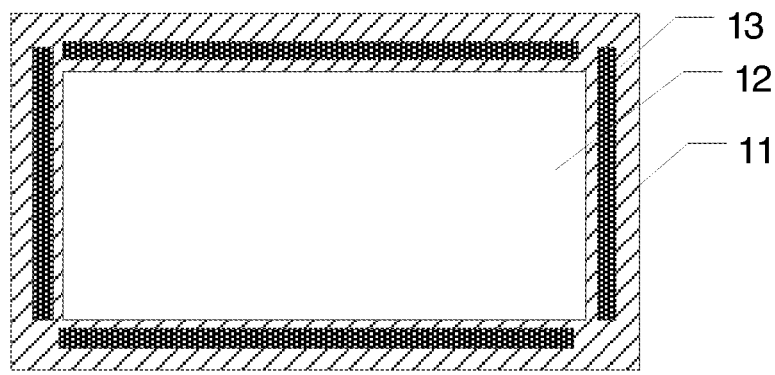
FIG. 1 is a structural schematic diagram of a conventional display device attached with a double-sided tape.
Figure 2:
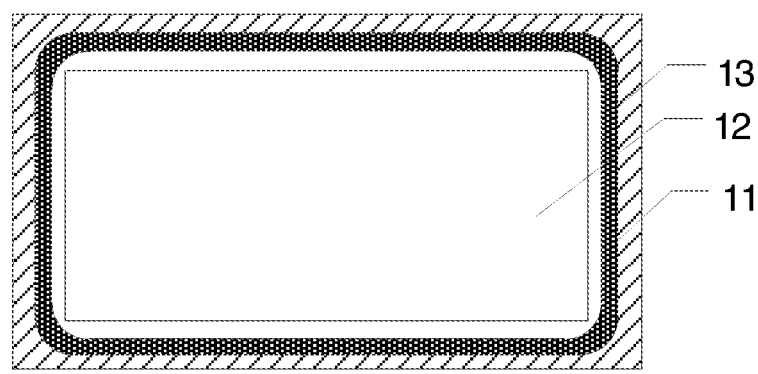
FIG. 2 is a structural schematic diagram of a conventional display device attached with a liquid adhesive being dispensed.

REFERENCE NUMERAL 100 and 200: display device, 11: substrate, 12: display panel, 13: frame sealant layer, 111: light-emitting region, 112: frame region, 121: display region, 122: non-display region, 131: liquid adhesive region, 132: solid adhesive region, 13a: liquid adhesive, 13b: solid adhesive, 11a: backlight module, 11b: cover glass, and 110: groove.

DETAILED DESCRIPTION OF EMBODIMENTS

The technical solution of the present application embodiment will be clarified and completely described with reference accompanying drawings in embodiments of the present application embodiment.

In the description of the present application, it should be explained that the terms "center", "portrait", "transverse", "length", "width", "thickness", "upper", "lower", "front", "back", "left", "right", "vertical", "horizontal", "top", "bottom", "inside", "outside", etc. are based on the drawings. The orientation or positional relationship is only for the convenience of describing the present application and simplifying the description, and does not indicate or imply that the device or element referred to must have a specific orientation, structure and operation in a specific orientation, and should not be viewed as limitations of the present application.

The following application provides many different embodiments or examples for implementing different structures of the present application. To simplify the application of the present application, the components and settings of specific examples are described below. Obviously, these are merely examples instead of limitation of the present application. Furthermore, the present application may repeat reference numbers and/or reference letters in different examples, and such repetition is for the purpose of simplicity and clarity, and does not indicate the relationship between the various embodiments and/or settings. Moreover, the present application provides examples of various specific processes and materials, but the applicability of other processes and/or application of other materials may be appreciated by a person skilled in the art.

First Embodiment

Figure 3:
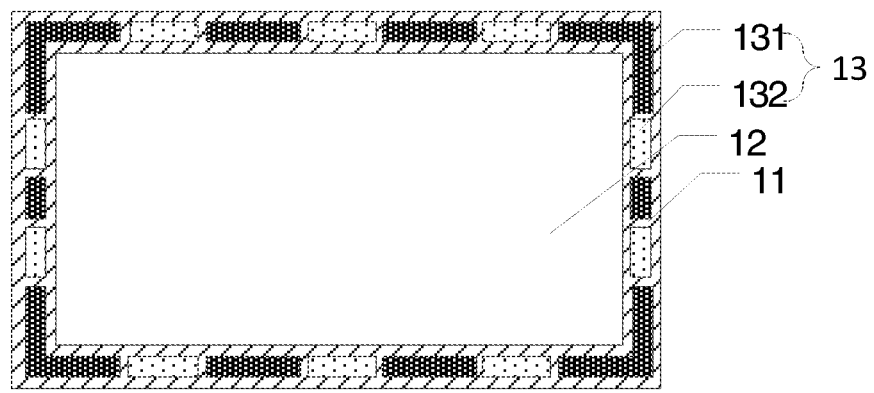
FIG. 3 is a planar view of a display device provided by a first embodiment of the present application.

As shown in FIG. 3, FIG. 3 is a planar view of a display device provided by an embodiment of the present application. This embodiment provides a display device 100 including a substrate 11, a display panel 12, and a frame sealant layer 13.

Figure 4:
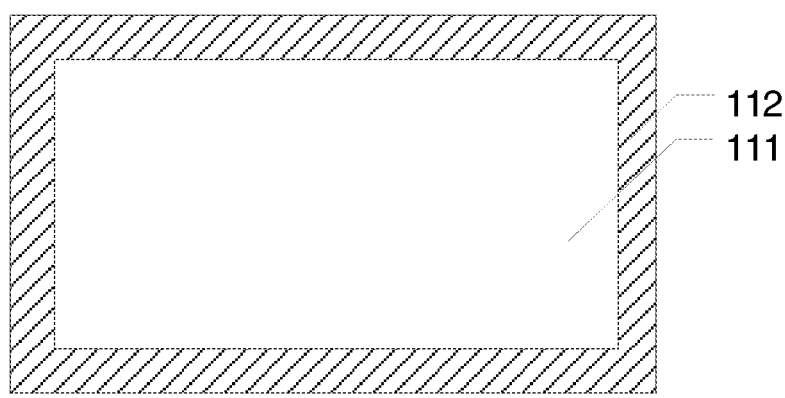
FIG. 4 is a planar view of a backlight module provided by the first embodiment of the present application.

As shown in FIG. 4, FIG. 4 is a planar view of a backlight module provided by an embodiment of the present application. The substrate 11 is a backlight module 11a. The backlight module 11a includes a light-emitting region 111 and a frame region 112 surrounding the light-emitting region 111. The backlight module includes a light guide plate, a light source, and a backplate. The light source is arranged on a side of the light guide plate. The backplate is arranged on a back of the light guide plate to support the light guide plate. In addition, a heat pipe unit is also provided on the backplate for conducting a heat emitted by the light source to a surface of the backplate.

Figure 5:
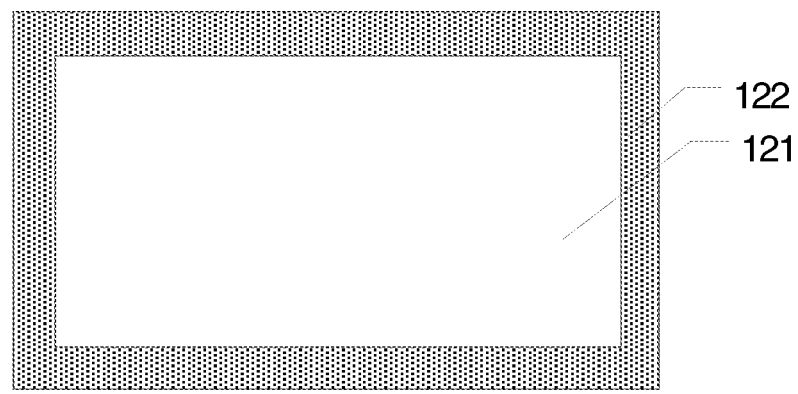
FIG. 5 is a planar view of a display panel provided by the first embodiment of the present application.

As shown in FIG. 5, FIG. 5 is a planar view of the display panel provided by an embodiment of the present application. The display panel 12 has a display region 121 and a non-display region 122 surrounding the display region 121. The display panel 12 is a curved liquid crystal display (LCD) panel. The display panel 12 includes an array substrate, a color filter substrate, and a liquid crystal layer. The array substrate and the color filter substrate are arranged opposite to each other, and the liquid crystal layer is provided between the array substrate and the color filter substrate.

Figure 6:
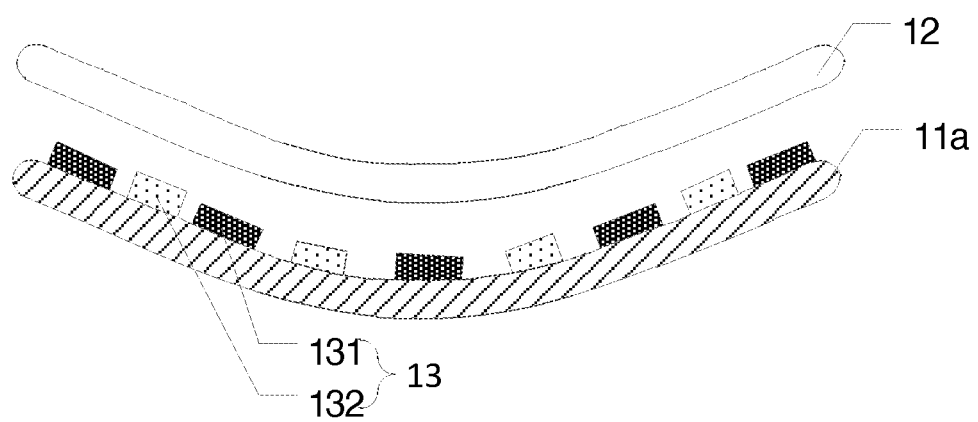
FIG. 6 is a cross-sectional view of the display device provided by the first embodiment of the present application.

As shown in FIG. 6, FIG. 6 is a cross-sectional view of a display device provided by an embodiment of the present application. The frame sealant layer 13 is provided between the backlight module 11 and the display panel 12 to adhere the display panel 12 and the backlight module 11a.

As shown in FIGS. 1 and 4, the frame sealant layer 13 is correspondingly distributed in the non-display region 122 of the display panel 12 and surrounds the display region 121. The backlight module 11 is attached to the display panel 12, the light-emitting region 111 faces the display region 121, the frame region 112 faces the non-display region 122, and the frame sealant layer 13 is also arranged in the frame region 112 of the backlight module 11a and surrounds the light-emitting region 111.

Specifically, the frame sealant layer 13 includes liquid adhesive regions 131 and solid adhesive regions 132 disposed at intervals. In other words, the liquid adhesive regions 131 and the solid adhesive regions 132 are on a same straight line, which facilitates reducing a space of the frame region 112 of the backlight module 11a and a space of the non-display region 122 of the display panel 12, thereby reducing a space of an entire frame of the display device 100 and solving a problem of an adhesiveness of a narrow frame display device being limited.

The liquid adhesive regions 131 are provided with liquid adhesives 13a. The solid adhesive regions 132 are provided with solid adhesives 13b. The solid adhesive 13b is a double-sided adhesive tape. The liquid adhesive 13a is any one of a moisture curing liquid adhesive, a heat curing liquid adhesive, or an AB glue. An initial adhesiveness of the liquid adhesive 13a is relatively poor before being cured, and has a good adhesiveness after being cured. In other words, a strength of the liquid adhesive 13a gradually appears over time, generally about 24 hours. An initial adhesiveness of the solid adhesive 13b is relatively good. In other words, an adhesiveness of the solid adhesive 13b deteriorates over time.

Therefore, during an adhering process, the solid adhesive 13b pre-adheres the display panel 12 and the substrate 11 together, which solves a problem of a poor pre-adhesiveness of the liquid adhesive 13a when the liquid adhesive 13a is adopted alone for frame adhering. The solid adhesive 13b also provides a support for the liquid adhesive 13a. The liquid adhesive 13a can tightly adhere the display panel 12 and the substrate 11 together over time to ensure a transportation and an inspection of the display device 100 during the manufacturing process, thereby improving a production efficiency and breaking limitations of an inconvenient operation of the liquid adhesive 13a.

In this embodiment, an area of the solid adhesive region 132 is less than an area of the liquid adhesive region 131. For example, the area of the liquid adhesive region 131 occupies more than 50% of an area of an entire frame sealant layer 13, so as to prevent an adhering area of the solid adhesive region 132 from being too large and affecting an adhesiveness of the entire frame sealant layer 13, which facilitates further enhancing an adhesiveness between the frame region 112 of the backlight module 11a and the non-display region 122 of the display panel 12.

In this embodiment, distances between two adjacent liquid adhesive regions 131 and the solid adhesive region 132 range from 2 to 3 um. During an adhering process of the backlight module 11a and the display panel 12, the liquid adhesives 13a in the liquid adhesive regions 131 are prevented from overflowing to the solid adhesive regions 132 and affecting the initial adhesiveness of the solid adhesives 13b.

In this embodiment, the display panel 12 includes four corners, and each of the corners is provided with one of the liquid adhesive regions 131 correspondingly. The liquid adhesives 13a being disposed on the four corners of the display panel 12 facilitate enhancing an adhesiveness at corners of the display device 100, preventing the display device 100 from debonding during the transportation and the inspection, and increasing a yield rate of the display device 100.

This embodiment provides the display device 100, wherein the liquid adhesive 13a and the solid adhesive 13b are disposed at intervals. While solving a problem of the liquid adhesive 13a being pressed before curing causing the adhesiveness not being able to be ensured and an adhesive space of the narrow frame display device being limited, the solid adhesive 13b provides a certain degree of rigidity for the liquid adhesive 13a, such that the display panel 12 and the substrate 11 provides a support for the liquid adhesive 13a during an adhering process, which enhances an overall adhesiveness of the display device 100.

Figure 7:
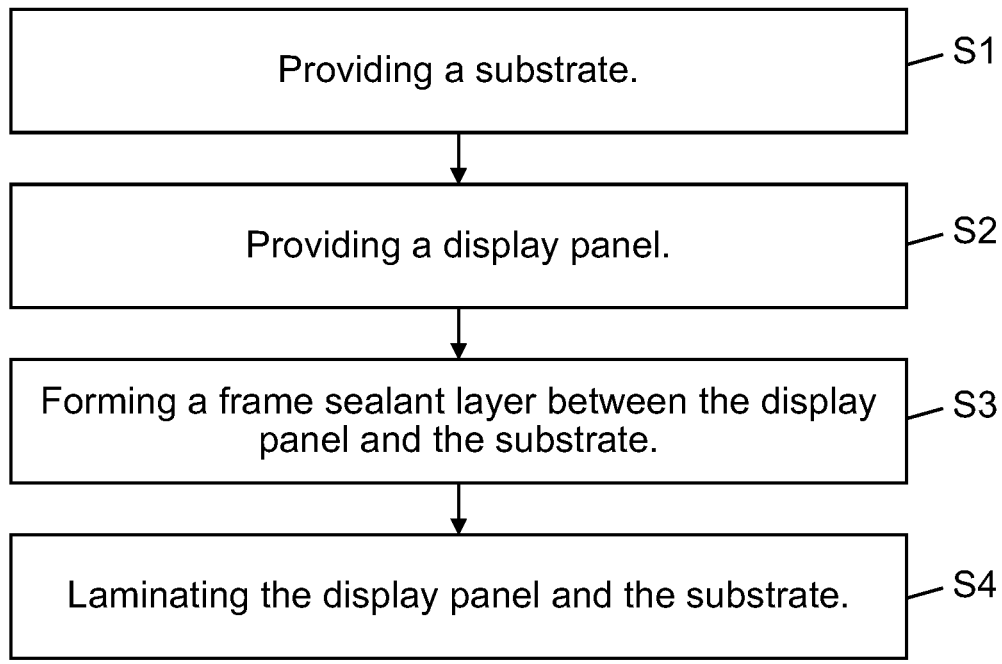
FIG. 7 is a flowchart of a manufacturing method of the display device provided by the first embodiment of the present application.

As shown in FIG. 7, FIG. 7 is a flowchart of a manufacturing method of a display device provided by an embodiment of the present application. This embodiment provides a manufacturing method of a display device including the following steps S1)-S4).

S1): Providing a substrate.

As shown in FIG. 4, the substrate 11 is a backlight module 11a. The backlight module includes a light-emitting region 111 and a frame region 112 surrounding the light-emitting region 111. The backlight module includes a light guide plate, a light source, and a backplate. The light source is arranged on a side of the light guide plate. The backplate is arranged on a back of the light guide plate to support the light guide plate. In addition, a heat pipe unit is also provided on the backplate for conducting a heat emitted by the light source to a surface of the backplate.

S2) Providing a display panel including a display region and a non-display region surrounding the display region.

As shown in FIG. 5, the display panel 12 includes a display region 121 and a non-display region 122 surrounding the display region 121. The display panel 12 is a curved liquid crystal display panel.

S3) Forming a frame sealant layer between the display panel and the substrate to adhere the display panel and the substrate. The fame sealant layer is correspondingly distributed in the non-display region of the display panel and surrounds the display region. The frame sealant layer includes liquid adhesive regions and solid adhesive regions disposed at intervals. Each of the liquid adhesive regions is provided with a liquid adhesive. Each of the solid adhesive regions is provided with a solid adhesive.

Figure 8:
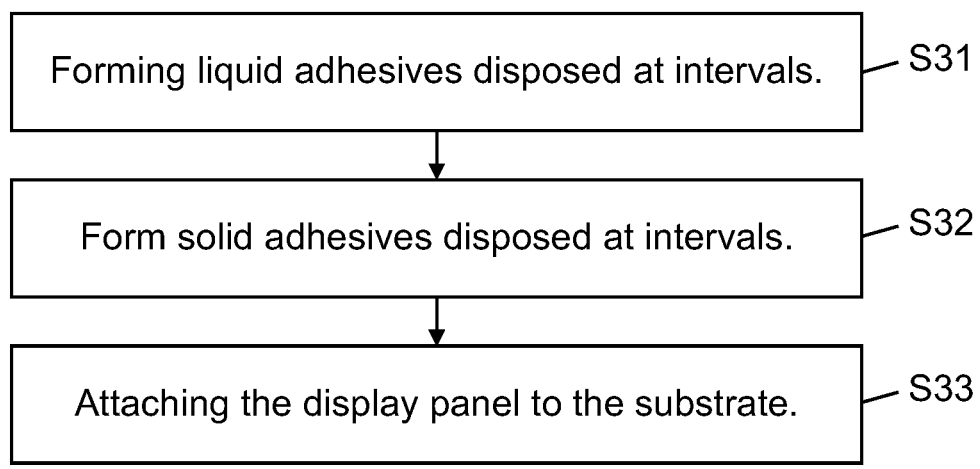
FIG. 8 is a flowchart of a manufacturing method of a frame sealant layer provided by the first embodiment of the present application.

As shown in FIG. 8, FIG. 8 is a flowchart of a manufacturing method of a frame sealant layer provided by an embodiment of the present application. Step S3) specifically includes the following steps S31)-S33).

S31) Dispensing any one of a moisture curing liquid adhesive, a heat curing liquid adhesive, or an AB glue at a frame region of the substrate to form the liquid adhesives disposed at intervals. The liquid adhesives form the liquid adhesive regions of the frame sealant layer.

S32) Attaching a double-sided tape to the frame region of the substrate to form the solid adhesives disposed at intervals. The solid adhesives form the solid adhesive regions of the frame sealant layer. The double-sided tape is provided with a release film on above and below, and a width of the release films is same as a width of the double-sided tape.

During an attaching process, a release film on the double-sided tape is torn off. Aligning process is conducted through a jig or visual inspection on the substrate 11 to align an end of the double-sided tape to a starting end of the substrate 11, and attach all double-sided tapes on the substrate 11 in one direction. According to this method, a plurality of solid adhesives 13b disposed at intervals are formed on the substrate 11.

S33) Attaching the display panel to the substrate. The light-emitting region faces the display region. The frame region faces the non-display region. The frame sealant layer is disposed in the frame region of the backlight module and surrounds the light-emitting region.

S4) Laminating the display panel and the substrate. A laminating device is configured to perform a laminating process on the display panel and the substrate, so that the display panel and the substrate are tightly adhered to each other through the frame sealant layer. The laminating device includes a laminating system, an ultraviolet curing system, and a control system. Through controlling the laminating system in a same device, the display device to be pressed is laminated and cured. In particular, a laminating step of the display device can also be controlled, so that the laminating and curing steps of the display panel and the substrate are unified, and manufacturing steps of the display device are reduced. In addition, since a frame sealant of the display device is not completely cured during laminating, there is no need for a large external force to laminate the substrate, thereby making its operation easier. As the laminating proceeds, a curing degree of the frame sealant becomes higher, so as to ensure an accuracy of the laminating within a controllable range, and greatly enhance a product yield.

As shown in FIGS. 3 and 6, a frame sealant layer 13 is provided between the backlight module 11 and the display panel 12 to adhere the display panel 12 and the backlight module 11a.

The frame sealant layer 13 is correspondingly distributed in the non-display region 122 of the display panel 12 and surrounds the display region 121. The backlight module 11 is attached to the display panel 12, the light-emitting region 111 faces the display region 121, the frame region 112 faces the non-display region 122, and the frame sealant layer 13 is also arranged in the frame region 112 of the backlight module 11a and surrounds the light-emitting region 111.

Specifically, the frame sealant layer 13 includes the liquid adhesive regions 131 and the solid adhesive regions 132 disposed at intervals. In other words, the liquid adhesive regions 131 and the solid adhesive regions 132 are on a same straight line, which facilitates reducing a space of the frame region 112 of the backlight module 11a and a space of the non-display region 122 of the display panel 12, thereby reducing a space of an entire frame of the display device 100 and solving a problem of an adhesiveness of a narrow frame display device being limited.

The liquid adhesive regions 131 are provided with liquid adhesives 13a. The solid adhesive regions 132 are provided with solid adhesives 13b. The solid adhesive 13b is a double-sided adhesive tape. The liquid adhesive 13a is any one of a moisture curing liquid adhesive, a heat curing liquid adhesive, or an AB glue. An initial adhesiveness of the liquid adhesive 13a is relatively poor before being cured, and has a good adhesiveness after being cured. In other words, a strength of the liquid adhesive 13a gradually appears over time, generally about 24 hours. An initial adhesiveness of the solid adhesive 13b is relatively good. In other words, an adhesiveness of the solid adhesive 13b deteriorates over time.

Therefore, during an adhering process, the solid adhesive 13b pre-adheres the display panel 12 and the substrate 11 together, which solves a problem of a poor pre-adhesiveness of the liquid adhesive 13a when the liquid adhesive 13a is adopted alone for frame adhering. The solid adhesive 13b also provides a support for the liquid adhesive 13a. The liquid adhesive 13a can tightly adhere the display panel 12 and the substrate 11 together over time to ensure a transportation and an inspection of the display device 100 during the manufacturing process, thereby improving a production efficiency and breaking limitations of an inconvenient operation of the liquid adhesive 13a.

In this embodiment, an area of the solid adhesive region 132 is less than an area of the liquid adhesive region 131. For example, the area of the liquid adhesive region 131 occupies more than 50% of an area of an entire frame sealant layer 13, so as to prevent an adhering area of the solid adhesive region 132 from being too large and affecting an adhesiveness of the entire frame sealant layer 13, which facilitates further enhancing an adhesiveness between the frame region 112 of the backlight module 11a and the non-display region 122 of the display panel 12.

In this embodiment, distances between two adjacent liquid adhesive regions 131 and the solid adhesive region 132 range from 2 to 3 um. During an adhering process of the backlight module 11a and the display panel 12, the liquid adhesives 13a in the liquid adhesive regions 131 are prevented from overflowing to the solid adhesive regions 132 and affecting the initial adhesiveness of the solid adhesives 13b.

In this embodiment, the display panel 12 includes four corners, and each of the corners is provided with one of the liquid adhesive regions 131 correspondingly. The liquid adhesives 13a formed in the liquid adhesive regions 131 facilitate enhancing an adhesiveness at corners of the display device 100, preventing the display device 100 from debonding during the transportation and the inspection, and increasing a yield rate of the display device 100.

This embodiment provides the manufacturing method of the display device, wherein the liquid adhesive 13a and the solid adhesive 13b are disposed at intervals. While solving a problem of the liquid adhesive 13a being pressed before curing causing the adhesiveness not being able to be ensured and an adhesive space of the narrow frame display device being limited, the solid adhesive 13b provides a certain degree of rigidity for the liquid adhesive 13a, such that the display panel 12 and the substrate 11 provides a support for the liquid adhesive 13a during an adhering process, which enhances the overall adhesiveness of the display device 100.

Second Embodiment

This embodiment provides a display device and a manufacturing method thereof, including most of the technical solutions of the first embodiment. A difference is that a substrate 11 is a cover glass, and a display panel 12 is a curved flexible display panel.

Figure 9:
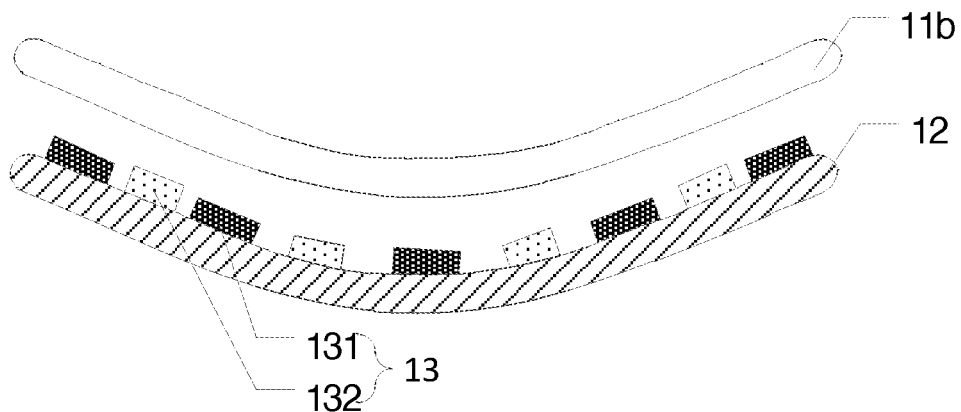
FIG. 9 is a cross-sectional view of a display device provided by a second embodiment of the present application.

As shown in FIG. 9, FIG. 9 is a cross-sectional view of the display device provided by an embodiment of the present application. This embodiment provides a display 200 including the substrate 11, the display panel 12, and a frame sealant layer 13. When the substrate 11 is a cover glass 11b and the display panel 12 is a flexible display panel, the cover glass 11b and the display panel 12 are arranged opposite to each other, and the frame sealant layer 13 is provided between the cover glass 11b and the display panel 12.

The cover glass 11b has a light-emitting region 111 and a frame region 112 surrounding the light-emitting region 111. The display panel 12 has a display region 121 and a non-display region 122 surrounding the display region 121. The frame sealant layer 13 is provided between the cover glass 11b and the display panel 12 to adhere the display panel 12 and the cover glass 11b.

This embodiment provides a display 200, wherein the liquid adhesive 13a and the solid adhesive 13b are disposed at intervals. While solving a problem of the liquid adhesive 13a being pressed before curing causing the adhesiveness not being able to be ensured and an adhesive space of the narrow frame display device being limited, the solid adhesive 13b provides a certain degree of rigidity for the liquid adhesive 13a, such that the display panel 12 and the cover glass 11b provides a support for the liquid adhesive 13a during an adhering process, which enhances an overall adhesiveness of the display device 200.

Figure 10:
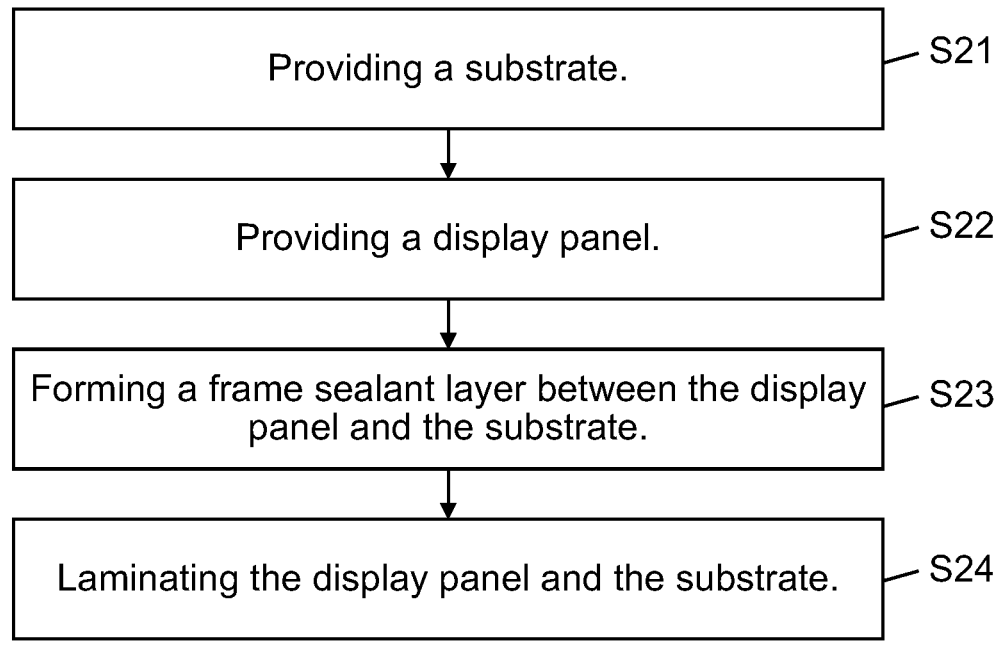
FIG. 10 is a flowchart of a manufacturing method of the display device provided by the second embodiment of the present application.

As shown in FIG. 10, FIG. 10 is a flowchart of a manufacturing method of a display device provided by an embodiment of the present application. This embodiment provides a method for manufacturing a display device including the following steps S21)-S24).

S21) Providing a substrate. The substrate is a glass substrate, and the glass substrate has a light-emitting region and a frame region surrounding the light-emitting region.

S22) Providing a display panel including a display region and a non-display region surrounding the display region.

S23) Forming a frame sealant layer between the display panel and the substrate to adhere the display panel and the substrate. The fame sealant layer is correspondingly distributed in the non-display region of the display panel and surrounds the display region. The frame sealant layer includes liquid adhesive regions and solid adhesive regions disposed at intervals. Each of the liquid adhesive regions is provided with a liquid adhesive. Each of the solid adhesive regions is provided with a solid adhesive.

Figure 11:
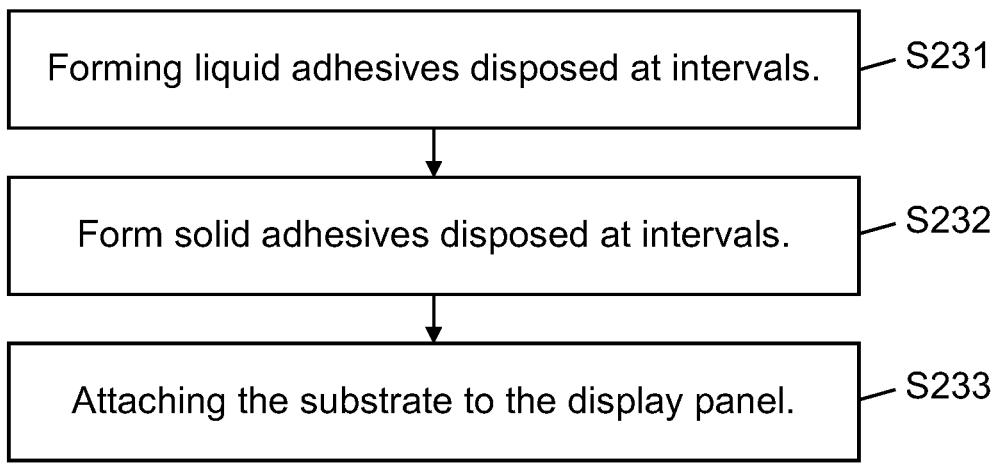
FIG. 11 is a flowchart of a manufacturing method of a frame sealant layer provided by the second embodiment of the present application.

As shown in FIG. 11, FIG. 11 is a flowchart of a manufacturing method of a frame sealant layer provided by the second embodiment of the present application. Step S23) specifically includes the following steps S231)-S233).

S231) Dispensing any one of a moisture curing liquid adhesive, a heat curing liquid adhesive, or an AB glue at the non-display region of the display panel to form the liquid adhesives disposed at intervals. The liquid adhesives form the liquid adhesive regions of the frame sealant layer. The display panel includes four corners, and each of the corners is provided with one of the liquid adhesive regions. The liquid adhesives are formed in the liquid adhesive regions. In this embodiment, the display panel 12 including four corners and the liquid adhesives 13a being formed facilitate enhancing an adhesiveness at corners of the display device 200, preventing the display device 200 from debonding during a transportation and an inspection, and increasing a yield rate of the display device 200.

S232) Attaching a double-sided tape at the non-display region of the display panel to form the solid adhesives disposed at intervals. The solid adhesives form the solid adhesive regions of the frame sealant layer. The double-sided tape is provided with a release film on above and below, and a width of the release films is same as a width of the double-sided tape.

During an attaching process, a release film on the double-sided tape is torn off. Aligning process is conducted through a jig or visual inspection on the substrate 11 to align an end of the double-sided tape to a starting end of the display panel 12, and attach all double-sided tapes on the display panel 12 in one direction. According to this method, a plurality of solid adhesives 13b disposed at intervals are formed on the display panel 12.

S233) Attaching the substrate to the display panel. The light-emitting region faces the display region. The frame region faces the non-display region. The frame sealant layer is also disposed in the frame region of the backlight module and surrounds the light-emitting region.

As shown in FIG. 9, in this embodiment, the frame sealant layer 13 includes the liquid adhesive regions 131 and the solid adhesive regions 132 disposed at intervals. In other words, the liquid adhesive regions 131 and the solid adhesive regions 132 are on a same straight line, which facilitates reducing a space of the frame region 112 of the cover glass 11b and a space of the non-display region 122 of the display panel 12, thereby reducing a space of an entire frame of the display device 200 and solving a problem of an adhesiveness of a narrow frame display device being limited.

In this embodiment, distances between the two adjacent liquid adhesive regions and the solid adhesive region range from 2 to 3 um. During the adhering process of the cover glass 11b and the display panel 12, the liquid adhesive 13a in the liquid adhesive region 131 is prevented from overflowing to the solid adhesive region 132 and affects the initial adhesiveness of the solid adhesive 13b.

In this embodiment, the display panel 12 includes four corners, and each of the corners is provided with one of the liquid adhesive regions 131 correspondingly. The liquid adhesives 13a formed at the liquid adhesive regions 131 facilitate enhancing an adhesiveness at corners of the display device 100, preventing the display device 100 from debonding during the transportation and the inspection, and increasing the yield rate of the display device 100.

S24) Laminating the display panel and the substrate. A laminating device is configured to perform a laminating process on the display panel and the substrate, so that the display panel and the substrate are tightly adhered to each other through the frame sealant layer. The laminating device includes a laminating system, an ultraviolet curing system, and a control system. Through controlling the laminating system in a same device, the display device to be pressed is laminated and cured. In particular, a laminating step of the display device can also be controlled, so that the laminating and curing steps of the display panel and the substrate are unified, and manufacturing steps of the display device are reduced. In addition, since a frame sealant of the display device is not completely cured during laminating, there is no need for a large external force to laminate the substrate, thereby making its operation easier. As the laminating proceeds, a curing degree of the frame sealant becomes higher, so as to ensure an accuracy of the laminating within a controllable range, and greatly enhance a product yield.

Figure 12:
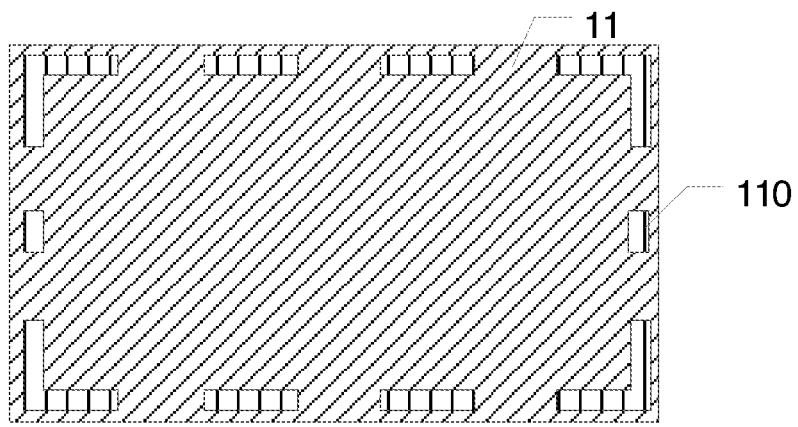
FIG. 12 is a planar view of a substrate provided by the second embodiment of the present application.

Furthermore, this embodiment provides a display device and a manufacturing method thereof. As shown in FIG. 12, through defining a plurality of grooves 110 at intervals on the substrate 11, the grooves 100 are correspondingly arranged as liquid adhesive regions, so that during the laminating process of the display panel and the substrate, an adhesiveness between the display panel and the substrate is increased to prevent debonding.

Technical effects of the present application are to provide the display panel and the manufacturing method thereof, wherein the liquid adhesive and the solid adhesive are disposed at intervals. While solving the problem of the liquid adhesive being pressed before curing causing the adhesiveness not being able to be ensured and the adhesive space of the narrow frame display device being limited, the solid adhesive provides a certain degree of rigidity for the liquid adhesive, such that the display panel and the substrate provides the support for the liquid adhesive during the adhering process, which enhances the overall adhesiveness of the display device.

In the above embodiments, the descriptions of the various embodiments are different in emphases, for contents not described in detail, please refer to related description of other embodiments.

The display device and the manufacturing method thereof provided by embodiments of the present application are described in detail above, and the description of embodiments above is only for helping to understand technical solutions of the present application and its core idea. It should be understood that for a person of ordinary skill in the art can make various modifications of the technical solutions of the embodiments of the present application above. However, it does not depart from the scope of the technical solutions of the embodiments of the present application.

What is claimed is:

1. A display device, comprising:
a substrate;
a display panel comprising a display region and a non-display region surrounding the display region; and
a frame sealant layer configured to adhere the display panel and the substrate, wherein the fame sealant layer is correspondingly distributed in the non-display region of the display panel and surrounding the display region, the frame sealant layer comprises liquid adhesive regions and solid adhesive regions disposed at intervals, each of the liquid adhesive regions is provided with a liquid adhesive, and each of the solid adhesive regions is provided with a solid adhesive.

2. The display device according to claim 1, wherein the solid adhesive is a double-sided tape, and the liquid adhesive is any one of a moisture curing liquid adhesive, a heat curing liquid adhesive, or an AB glue.

3. The display device according to claim 1, wherein distances between two adjacent liquid adhesive regions and one of the solid adhesive regions range from 2 to 3 micrometers (um).

4. The display device according to claim 1, wherein an area of each of the solid adhesive regions is less than an area of each of the liquid adhesive regions.

5. The display device according to claim 1, wherein the substrate is a backlight module or a cover glass.

6. The display device according to claim 5, wherein the backlight module comprises a light-emitting region and a frame region surrounding the light-emitting region; and the backlight module is attached to the display panel, the light-emitting region faces the display region, the frame region faces the non-display region, and the frame sealant layer is disposed in the frame region of the backlight module and surrounds the light-emitting region.

7. The display device according to claim 1, wherein the display panel comprises four corners, each of the corners is provided with one of the liquid adhesive regions.

8. A manufacturing method of a display device, comprising steps of:
providing a substrate;
providing a display panel comprising a display region and a non-display region surrounding the display region; and
forming a frame sealant layer between the display panel and the substrate to adhere the display panel and the substrate, wherein the fame sealant layer is correspondingly distributed in the non-display region of the display panel and surrounding the display region, the frame sealant layer comprises liquid adhesive regions and solid adhesive regions disposed at intervals, each of the liquid adhesive regions is provided with a liquid adhesive, and each of the solid adhesive regions is provided with a solid adhesive.

9. The manufacturing method of the display device according to claim 8, wherein the step of forming the frame sealant layer between the display panel and the substrate comprises a step of:
dispensing any one of a moisture curing liquid adhesive, a heat curing liquid adhesive, or an AB glue at a frame region of the substrate to form the liquid adhesives disposed at intervals;
wherein the liquid adhesives form the liquid adhesive regions of the frame sealant layer, the display panel comprises four corners, each of the corners is provided with one of the liquid adhesive regions, and the liquid adhesives are formed in the liquid adhesive regions; and
the frame region of the substrate is attached with a double-sided tape to form the solid adhesives disposed at intervals, and the solid adhesives form the solid adhesive regions of the frame sealant layer.

10. The manufacturing method of the display device according to claim 8, wherein after the step of forming the frame sealant layer between the display panel and the substrate, the manufacturing method of the display device further comprises a step of:
laminating the display panel and the substrate.

\* \* \* \* \*